Patented Dec. 12, 1944

2,365,094

UNITED STATES PATENT OFFICE 2,365,094

PROCESS FOR THE CONVERSION OF CARBON MONOXIDE WITH HYDROGEN INTO HYDROCARBONS

Wilhelm Michael and Adam Buettner, Ludwigshafen-on-the-Rhine, Germany; vested in the Alien Property Custodian No Drawing. Application August 9, 1940, Serial No. 351,958. In Germany December 22, 1938

7 Claims. (Cl. 260—449.6)

The present invention relates to the conversion of carbon monoxide and hydrogen into hydrocarbons containing more than one carbon atom in the molecule.

It is already known that the conversion of carbon monoxide with hydrogen into liquid, solid and/or gaseous hydrocarbons containing more than one carbon atom in the molecule, may be carried out in the presence of catalysts consisting of or containing iron. Several methods have already been proposed for the preparation of these catalysts; for example, iron hydroxide has been precipitated from solutions of iron salts and subsequently been reduced by a treatment with reducing gases, such as hydrogen, at such high temperatures above 500° C. and for such a long time that a sintering occurred, or iron powder obtained by decomposition of iron carbonyl, has been converted into a solid porous mass by sintering. The said catalysts comprising iron have further been prepared by combustion of iron in a stream of oxygen and subsequent reduction of the molten ferrosoferric oxide thus obtained.

In the following the expression "compact iron" will be used and this means non-porous iron in the form of pieces of which two dimensions are at least 2 and 1 millimeter respectively.

We have now found that the aforesaid conversion of carbon monoxide with hydrogen may be carried out with particular advantage in the presence of iron catalysts, prepared by treating compact iron with oxidizing gases, preferably in the presence of steam, at such a high temperature and for such a long time that the iron becomes practically completely oxidised, but without melting of the iron or of the iron oxide formed, and subsequently reducing the said iron oxide to metal by treatment with reducing gases.

According to the process of the present invention catalysts are prepared from very cheap and readily available iron materials, as any suitable compact iron may be employed. Compact iron having two dimensions of more than about 5 millimeters and a third one of more than 0.1 millimeter is a preferred initial material. Advantageously sheet iron, for example, in the form of Raschig rings, or other hollow objects, is used. The compact iron treated may in part already be present in the form of oxides.

The said treatment with oxidising gases, for example air, may be carried out within a wide range of temperatures below the melting point of iron, for example between 400° and 1200° C., preferably between 700° and 900° C., and is continued until the iron is substantially completely converted into iron oxide.

The said treatment with reducing gases may be carried out at any temperature suitable for the reduction of iron oxide. Preferably a temperature of about 500° C. or more is used. In order to increase the mechanical strength of the catalyst, the said treatment with reducing gases may after the reduction of the iron oxide be continued until sintering sets in at the same or a higher temperature below the melting point of iron, for example, between about 600° and 1000° C., or the said reduction may also be carried out at the said higher temperatures.

During the said treatments with oxidising gases and with reducing gases the original shape of the compact iron objects remains substantially unchanged.

It has also proved very advantageous to comminute the oxide perpared by the treatment with oxidising gases, preferably by grinding it to a powder, then making it into shaped bodies, for example into pills, and subsequently subjecting the shaped bodies to a reducing treatment. This treatment is especially suitable for the regeneration of used iron catalysts.

Also the catalysts prepared without comminuting the oxides may be prepared in various shapes since the initial compact iron may be shaped in any desired manner.

The catalysts according to the present invention, in particular those prepared from compact iron consisting of hollow objects as stated above, are very suitable if high rates of flow of the gases are employed in the said conversion of carbon monoxide with hydrogen, as they cause only a slight resistance to the flow of the gases, so that no undesired high difference in pressure at the inlet and outlet of the catalyst space occurs. Therefore the said catalysts may, for example, advantageously be employed when converting carbon monoxide with hydrogen according to the process described in the copending application Ser. No. 277,630, filed June 6, 1939, now U. S. Patent No. 2,279,052, dated April 7, 1942.

The activity of the said catalysts may be increased by additions of alkali metal compounds, for example, halides, phosphates or borates of potassium, sodium, lithium or cesium, for example, in amounts of about 0.1 to 10 per cent by weight or more. The said compounds may be added to the catalysts in a dry state during or after the said treatment with reducing gases or as aqueous solutions before or after the said treatment. The activity of the catalysts may further be increased by the addition of other substances beside the said alkali metal compounds, for example aluminum oxide, aluminum hydroxide, silicon dioxide and the like, and/or compounds (in particular oxides, or also carbonates, hydroxides or halides) of copper, titanium, manganese, tungsten, molybdenum, chromium, thorium, cerium, zirconium or other rare earths. These substances are usually employed in amounts varying from fractions of one per cent up to several per cent.

As initial materials for the said conversion of carbon monoxide with hydrogen gas mixtures may be employed, which contain the said gases in approximately equal volumetric amounts. However, the said mixtures may also contain considerably larger proportions of carbon monoxide or of hydrogen. Furthermore the said gas mixtures may contain diluent gases, such as nitrogen, carbon dioxide, methane and the like. If desired, additional amounts of carbon monoxide and/or hydrogen may be added during the said conversion.

The said conversion of carbon monoxide with hydrogen may be carried out in the gaseous phase or in the liquid phrase. When working in the gaseous phase the said conversion is preferably carried out with circulating gases, for example as described in the said U. S. Patent No. 2,279,052. When carrying out the said conversion in the liquid phase, suitable liquid or fusible hydrocarbons are employed as the liquid medium, such as for example mineral oils or fractions thereof, tar oils, paraffin wax, products obtained by destructive hydrogenation of carbonaceous materials, and the like. Advantageously oils obtained by the conversion of carbon monoxide with hydrogen are employed as the liquid medium, suitably oils obtained in a previous conversion under substantially the same conditions are used.

The said conversion of carbon monoxide with hydrogen may be carried out at any suitable temperature, preferably at a temperature within the range of about 180° to about 450° C., and under reduced pressure, atmospheric pressure or higher pressures, for example of 5, 10, 20, 50, 100 atmospheres or more.

The following examples will further illustrate in what manner the present invention may be carried out in practice, but it should be understood that the invention is not limited to the said examples.

Example 1

Raschig rings having a diameter of 10 millimeters, made of sheet iron of a thickness of 1.5 millimeters, are treated with air at 700° C. until the iron is completely oxidised. Thereupon the rings are reduced by means of hydrogen at 600° C. and subsequently moistened with a solution of borax in such a manner that the prepared catalyst contains 1 per cent by weight of borax, and dried. Water gas containing carbon monoxide and hydrogen in volumetric ratio of 4:5, is passed over this catalyst at a temperature of 320° C. and under a pressure of 20 atmospheres, in a circulation process as described in the said U. S. Patent No. 2,279,052, whereby 80 per cent by volume of the water gas is converted into hydrocarbons substantially boiling within the boiling range of benzine.

Example 2

Pieces of iron are completely oxidised with air in the presence of steam at a temperature of 750° C. and then ground so finely in a ball mill that the ground mass passes through a sieve having 10,000 meshes per square centimeter. The fine dust of the iron oxide is then moistened with a borax solution containing ½% of borax with reference to the amount of iron employed, and then pressed to pills which are subsequently reduced with hydrogen at 600° C. and then kept for 6 hours in an atmosphere of hydrogen at 850° C., whereby sintering occurs.

The catalyst so obtained is employed in the same manner as described in Example 1 for the catalytic preparation of hydrocarbons from mixtures of carbon monoxide with hydrogen.

The said manner of preparation is especially suitable for the regeneration of used iron catalysts.

What we claim is:

1. A process for the conversion of carbon monoxide with hydrogen into hydrocarbons containing more than one carbon atom in the molecule which comprises operating in the presence of a catalyst prepared by treating compact iron bodies with an oxidising gas at such a high temperature and for such a long time that the iron becomes practically completely oxidised, but without melting of the iron or of the iron oxide formed, and subsequently reducing the iron oxide formed to metal by treatment with a reducing gas, said treatments with oxidising and reducing gases being carried out without substantially changing the original shape of the compact iron bodies.

2. In the process as claimed in claim 1, preparing the catalyst from compact iron bodies, having two dimensions of more than 5 millimeters and a third one of more than 0.1 millimeter.

3. In the process as claimed in claim 1, preparing the catalyst from sheet iron bodies in the form of Raschig rings.

4. In the process as claimed in claim 1, treating the compact iron bodies with an oxidising gas at a temperature between 700° and 900° C.

5. In the process as claimed in claim 1, reducing the oxide, obtained from the compact iron bodies, by treatment with a reducing gas at a temperature of at least 500° C.

6. In the process as claimed in claim 1, continuing the treatment with the reducing gas, after the reduction of the iron oxide, at a temperature below the melting point of iron until sintering sets in.

7. A process for the conversion of carbon monoxide with hydrogen into hydrocarbons containing more than one carbon atom in the molecule which comprises operating in the presence of a catalyst prepared by treating compact iron bodies with an oxidising gas at such a high temperature and for such a long time that the iron becomes practically completely oxidised, but without melting of the iron or of the iron oxide formed, subsequently reducing the iron oxide formed to metal by treatment with a reducing gas, said treatments with oxidising and reducing gases being carried out without substantially changing the original shape of the compact iron bodies, containing the conversion of carbon monoxide with hydrogen until the catalyst becomes deactivated, thereafter treating the catalyst with an oxidising gas at such a high temperature and for such a long time that the iron becomes practically and completely oxidised, but without melting of the iron and iron oxide formed, comminuting the oxide resulting from the latter oxidising treatment to a fine powder, pressing the powder into pills, subjecting the pills to a treatment with a reducing gas at a temperature of at least 500° C. but below the melting point of iron, until sintering sets in and re-using the sintered catalyst in the conversion of carbon monoxide with hydrogen.

WILHELM MICHAEL.
ADAM BUETTNER.

CERTIFICATE OF CORRECTION.

Patent No. 2,365,094. December 12, 1944.

WILHELM MICHAEL, ET AL.

It is hereby certified that error appears in the printed specification of the above numbered patent requiring correction as follows: Page 2, second column, line 56, claim 7, for "containing" read --continuing--; and that the said Letters Patent should be read with this correction therein that the same may conform to the record of the case in the Patent Office.

Signed and sealed this 12th day of February, A. D. 1946.

Leslie Frazer (Seal)                  First Assistant Commissioner of Patents.